3,025,210
SLIDE MOUNTING DEVICE

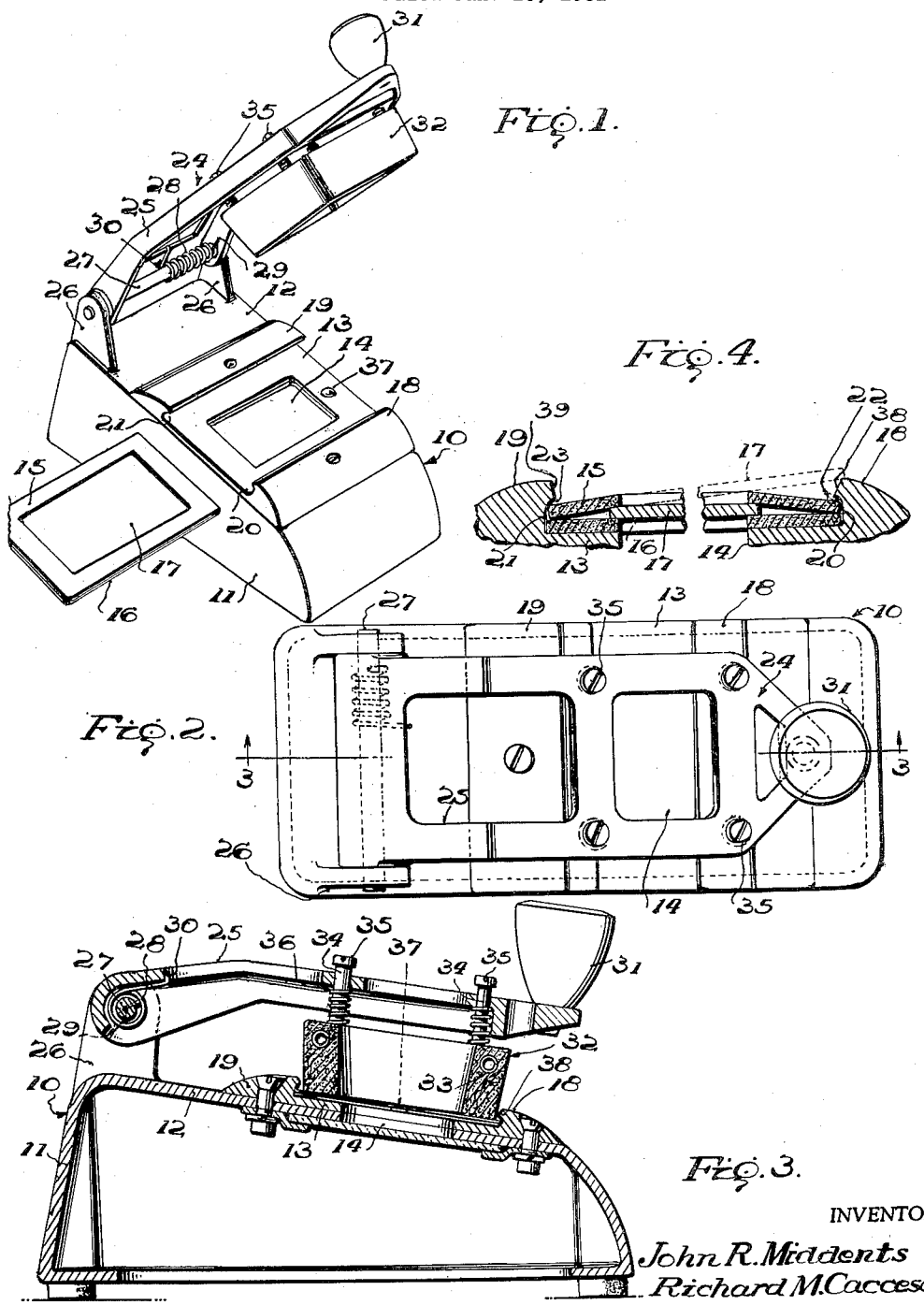

John R. Middents, St. Charles, Mo. (A.P.O. 403, New York, N.Y.), and Richard M. Caccese, 465 Court St., Reno, Nev.
Filed Jan. 10, 1961, Ser. No. 81,910
8 Claims. (Cl. 156—539)
(Granted under Title 35, U.S. Code (1952), sec. 266)

The invention described herein, if patented, may be manufactured and used by or for the Government for governmental purposes, without the payment to us of any royalty thereon.

The invention relates to means for sealing together by heat or pressure or both two frames having a photographic transparency centered therebetween so as to form a slide for use in slide viewers or slide projectors. Specifically, the invention is intended to be an improvement of our copending application, Serial Number 4,582, filed January 22, 1960, now Patent No. 3,005,483, dated October 24, 1961. In such apparatus, one of the main problems is to maintain the transparency centered relative to the frames until the sealing operation has commenced. Thereafter, of course, the pressure of the sealing means holds the assembly of frames and transparency in compressed relation throughout the sealing operation.

With the foregoing in view, it is an object of the invention to provide in combination with a sealing means, novel means for holding the assembly or sandwich in lightly compressed relation until the same is firmly engaged by the sealing means.

A further object is to provide means providing two opposed grooves providing a holder for said assembly together with means operatively associated with said grooves to lightly compress said frames and transparency together while in said holder.

Other objects and advantages reside in the specific elements of the invention, combinations and sub-combinations of such elements with each other and/or with a sealing means and the assembly to be sealed, all of which will be readily apparent to those skilled in the art upon reference to the attached drawing which illustrates one species of the invention and to the following specification wherein the invention is described and claimed.

In the drawing:

FIGURE 1 is a perspective view taken from above and showing the parts in position to receive a slide assembly therein.

FIGURE 2 is a top plan view, the parts being shown in the sealing position;

FIGURE 3 is a vertical sectional view taken substantially on the plane of the line 3—3 of FIGURE 2; and FIGURE 4 is an enlarged, fragmentary, vertical sectional view through the holding means for the assembly and taken substantially on the same plane as FIGURE 3.

Referring specifically to the drawing wherein like reference characters designate like parts in all views, 10 designates generally the combination of the invention which includes a support 11 which may comprise a hollow housing having a top wall 12 which mounts thereon a flat, rigid base 13. Base 13 and top wall 12 are formed with registering holes therethrough to provide a rectangular opening generally indicated by 14 which is substantially the size of the opening in the upper and lower frame members 15 and 16 respectively and slightly smaller than the transparency 17, FIGURE 4. Base 13 mounts thereon integrally or otherwise, spaced and opposed front and rear upstanding members 18 and 19 respectively which include inner faces formed with facing grooves 20 and 21. Grooves 20 and 21 include inner walls which are flush with the flat base 13 and comprise continuations of the upper surface thereof and outer walls 22, 23 which are inclined or curved to provide cam surfaces for a purpose to be apparent hereinafter. The interior of the housing 11 may include a suitable source of light, not shown, for illuminating the transparency for the purpose specified in our Pat. No. 3,005,483 aforesaid.

Suitable sealing means is generally indicated at 24 and may comprise a heat sealing means. Means 24 comprises a lever arm 25 having a rear end hinged to the support 11 by any suitable means such as the ears 26 and hinge pin 27. A suitable coil spring 28 may surround the pin 27 and includes opposite ends 29, 30 engaged respectively with the pin 24 and lever arm 25 so as to maintain the latter in the elevated position of FIGURE 1. Any suitable handgrip 31 is mounted on the forward end of lever arm 25. Lever arm 25 mounts any suitable sealing means on its undersurface such as the heat sealing unit 32 which preferably is in the form of a hollow rectangle having a heating coil 33 imbedded therein. Coil 33 is supplied with electric current by any suitable means, not shown. Preferably, the sealing unit 32 is mounted on four or more studs 34 which are fixed thereto and extend upwardly therefrom through lever arm 25 in which they are vertically slidable relative thereto. Heads 35 on studs 34 limit downward movement of the unit 32 relative to the lever arm 25. Expansive coil springs 36 surround the studs 34 between sealing unit 32 and lever arm 25. Springs 36 are quite strong and normally maintain the unit 32 as remotely of lever arm 25 as is permitted by the heads 35. However, springs 36 will yield slightly to distribute pressure evenly when the unit 32 is engaged with the base 12 and sufficient downward pressure is applied to the hand grip 31 as illustrated in FIGURE 3.

In operation, in one manner of using the device, an assembly of frames 15 and 16 with a transparency 17 centered therebetween is slid into the slideway provided by the base 12 and grooves 20, 21. Such movement is continued until the front end of the assembly engages any suitable stop such as the boss 37 formed on the base 12 at the far side of the opening 14. This arrangement automatically centers the assembly beneath the sealing unit 32. The distance between the floors of the grooves 20, 21 is substantially equal to the width of the assembly of frames 15 and 16 so that the same has a close sliding fit in the grooves. However, the cam surfaced outer walls 22, 23 converge with the inner walls of the grooves in the region of the floors thereof so as to be spaced from such inner walls distances less than the thickness of the assembly of frames. Thus, as the assembly is slid into position over the opening 14, such cam surfaces of the outer groove walls 22, 23 force the upper frame 15 into lightly compressive relation with the lower frame 16 and with the transparency 17 so that the latter is held against movement relative to the frames. This light grip is maintained continuously until the lever arm is swung downwardly so as to press the sealing unit 32 firmly against the assembly. Thereafter the sealing unit 32 compresses the frames 15 and 16 more tightly together until the sealing operation is completed.

If, for any reason, the operator has difficulty in keeping the transparency 17 centered while the assembly is being slid into sealing position on the base 12, the lower frame 16 is first slid into position against the stop 37. The transparency 17 is now placed in centered relation on the lower frame 16.

The upper frame 15 is now applied by inserting the rear edge into the rear groove 21 as indicated in broken lines in FIGURE 4. The front edge of the upper frame is now swung downwardly and snapped into the front groove 20. This operation is facilitated by a beveled cam surface 38 formed on the upper edge of the front upstanding member 18. Of course, the frame 15 has sufficient resilience to permit the slight bowing necessary to permit it to be snapped into place as aforesaid. The transparency 17 is maintained in centered relation throughout this operation by being lightly pressed against the lower frame by any suitable hand held holder inserted through the opening of the upper frame 15 after the same has been applied to the rear groove 21. Once, the upper frame 15 has been snapped into place, as above, the cam surfaces 22 and 23 of the groove are again operative to secure the elements of the assembly against relative movement. It is to be understood, of course, that this method may be used to apply the entire assembly merely by holding the two frames tightly together with the fingers of one hand while the assembly is snapped into place by the other hand.

The upper surface 39 of the upstanding member 19 may likewise be formed as a beveled cam surface so that the upper frame or the entire assembly may be applied in the reverse of the manner just described. Also, by providing two downwardly and inwardly inclined beveled cam surfaces 38 and 39, the front and rear edges of the assembly may be simultaneously engaged with both cam surfaces as the assembly (or the upper frame 15) is pressed downwardly whereby to bow the assembly and permit the front and rear edges thereof to snap into the grooves simultaneously.

It is apparent from the foregoing that the invention is one which is readily capable of being manufactured at low cost and one which can be used by "do it yourself" personnel with a minimum of skill or experience. Also, while there has been shown and described what is now thought to be a preferred species of the invention, it should be understood that the same is susceptible of other forms and expressions. Consequently, we do not limit ourselves to the precise structures or combinations shown and described hereinabove except as hereinafter claimed.

We claim:

1. The combination with a movable sealing means for sealing together an assembly of two frames sandwiching a photographic transparency therebetween; of holding means for holding the components of said assembly against relative movement during the sealing operation, said holding means including spaced and opposed fixed cam means, said cam means being so spaced and arranged that spaced portions of said frames inserted therebetween are lightly compressed together so as to squeeze said transparency therebetween to provide said assembly, and means for moving said sealing means into sealing engagement with said assembly.

2. The combination with a movable sealing means for sealing together an assembly comprising inner and outer frames with a photographic transparency centered therebetween; of holding means for holding said frames and transparency against relative movement during the sealing operation, said holding means comprising a rigid base supporting said inner frame thereon, laterally spaced and opposed gripping means, said gripping means including fixed cam portions so spaced from said base as to lightly compress laterally spaced frame portions together and to said base whereby to cause said frame portions to lightly grip said transparency therebetween, and means for moving said sealing means into firm engagement with said outer frame between said gripping means to tightly compress said frames together on said base during the sealing operation.

3. The combination with a movable sealing means for sealing together an assembly comprising inner and outer frames with a photographic transparency centered therebetween; of a substantially rigid base adapted to support said assembly thereon, laterally spaced and opposed upstanding means fixed to said base and formed with facing grooves providing holders receiving said assembly therein, said grooves being formed with inner walls flush with said base and opposed outer walls, said outer walls including fixed wedging means so spaced from said inner walls as to compress marginal portions of said frames together so as to prevent relative movement of said transparency and frames, and means for moving said sealing means into firm engagement with said assembly between said upstanding means so as to tightly compress said frames together on said base until the sealing operation is completed.

4. The combination with a movable sealing means for sealing together inner and outer frames having a photographic transparency centered therebetween; of a substantially rigid base adapted to support said assembly thereon, laterally spaced and opposed upstanding means fixed to said base and formed with facing grooves providing holders receiving said assembly therein, said grooves being formed with inner walls flush with said base and opposed outer walls, said outer wall of each groove being formed with a cam surface converging toward said inner wall, said cam surfaces engaging said outer frame and forcing the same into lightly compressive relation with said inner frame and said transparency whereby to prevent relative movement of said frames and transparency, and means for moving said sealing means into sealing engagement with said assembly between said upstanding means.

5. The combination of claim 4, wherein said assembly includes front and rear edges, said rear edge being adapted to be inserted into one of said grooves, said upstanding member in which said other groove is formed including a beveled upper surface adapted to engage said front edge of said assembly with a camming action as said assembly is swung downwardly whereby to bow said assembly and permit the same to be snapped into said last named groove.

6. The combination of claim 4, wherein said assembly includes front and rear edges, one of said edges being adapted to be inserted into one of said grooves, said upstanding member in which said other groove is formed being formed with means adapted to engage said other edge of said assembly and bow said assembly as the same is swung downwardly whereby to permit said last named edge of said assembly to be snapped into said last named groove.

7. The combination of claim 4, wherein said assembly includes front and rear edges, said upstanding members having upper surfaces adapted to engage said edges and bow said assembly as the latter is pressed downwardly whereby to permit said edges to be snapped into said grooves.

8. The combination of claim 4, wherein said assembly includes front and rear edges, said upstanding members being formed with downwardly and inwardly beveled upper surfaces providing cam surfaces adapted to engage said edges of said assembly and bow the latter as the same is pressed downwardly thereon whereby to permit said edges to be snapped into said grooves.

References Cited in the file of this patent

UNITED STATES PATENTS

| | | |
|---|---|---|
| 2,524,178 | Rochwite | Oct. 3, 1950 |
| 2,591,519 | Decker | Apr. 1, 1952 |